United States Patent
Wilkie et al.

(10) Patent No.: US 6,221,266 B1
(45) Date of Patent: Apr. 24, 2001

(54) VARIABLE CAPACITY CONTINUOUS EXTENDED AREA FILTER

(75) Inventors: Arnold E. Wilkie, Merritt Island; Michael W. Felber, Palm Bay; Jeffrey S. Haggard, Cocoa; Mark R. Miller, Melbourne, all of FL (US)

(73) Assignee: Hills, Inc., West Melbourne, FL (US)

( * ) Notice: Subject to any disclaimer, the term of this patent is extended or adjusted under 35 U.S.C. 154(b) by 0 days.

(21) Appl. No.: 09/225,675

(22) Filed: Jan. 6, 1999

Related U.S. Application Data
(60) Provisional application No. 60/070,525, filed on Jan. 6, 1998.

(51) Int. Cl.[7] ............................. B01D 35/12; B01D 37/00
(52) U.S. Cl. ......................... 210/791; 210/340; 210/341; 425/199
(58) Field of Search .................... 425/197, 198, 425/199; 210/767, 774, 775, 780, 790, 791, 340–341

(56) References Cited

U.S. PATENT DOCUMENTS

| | | | |
|---|---|---|---|
| 3,940,222 | 2/1976 | Zink | 425/199 |
| 5,462,653 | 10/1995 | Hills | 425/199 |

OTHER PUBLICATIONS
Fuji Polymer Filter System, author and date unknown.

*Primary Examiner*—Robert Popovics

(57) ABSTRACT

A molten polymer filtration assembly includes at least three independently controllable and removable filter housings which extend from a common inlet passage to a common outlet passage, thereby providing parallel flow paths for polymer filtration. Each of the filter housings includes an inlet valve controlling the flow of polymer from the inlet passage, an outlet valve controlling the flow of polymer to the outlet passage, and a filtration passage which extends between the inlet and outlet valves and houses a candle-type filtration element. When the inlet and outlet valves are opened, the filter housing is on-stream and allows polymer to flow from the inlet to the outlet passage. Each filter housing is individually controllable, and can be set in an on-stream state independent of the state of any of the other filter housings, such that any number of filter housings can be on-stream at a given time. By setting the number of on-stream filter housing in correspondence with the polymer flow rate, the polymer residence time can be maintained in a relatively narrow range of durations over a wide range of polymer flow rates, thereby ensuring that the polymer residence time within the filtration system remains below an acceptable duration and that the polymer residence time is regulated to avoid significant fluctuation or variances in the polymer residence time. Interlocks prevent the closure of the outlet valve of each filter housing unless the inlet valve for that housing is closed. Removal of any filter housing is prevented unless its valves are both closed.

22 Claims, 2 Drawing Sheets

VARIABLE CAPACITY CONTINUOUS EXTENDED AREA FILTER

CROSS REFERENCE TO RELATED APPLICATIONS

This application claims priority from U.S. Provisional Patent Application Ser. No. 60/070,525, entitled "Variable Capacity Continuous Extended Area Filter," filed Jan. 6, 1998. The disclosure of this provisional patent application is incorporated herein by reference in its entirety.

BACKGROUND OF THE INVENTION

1. Field of the Invention

The present invention relates to purification and filtration of molten polymer and, more particularly, to an improved method and apparatus for providing variable filtering capacity in a continuous polymer extrusion process.

2. Description of the Related Art

In processes involving extrusion of molten thermoplastic polymers such as polyethylene, Nylon, polyester, polystyrene, etc., it is necessary to filter foreign matter (i.e., contaminants) from the molten polymer. A variety of polymer filtration systems is known in the prior art for removing impurities from molten polymer. Two common types of polymer filters are screen changer systems and candle filter systems. Screen changers use screens to remove dust, dirt and foreign particles, and typically have a relatively small area of screen for a given flow rate of molten polymer. A candle filter system typically has two or more filter housings and uses valves to direct polymer to and from the filter housings. Each housing contains multiple candle-type filter elements. The candle filter element is a perforated tube covered by pleated screen wire in two or more layers. The candle filter system is normally used for high polymer flow rate and/or very fine filtration systems.

A very popular brand of the candle-type filter system is the Fluid Dynamics CPF system, which is manufactured by USF Filtration & Separation, Inc. It has two filter housings and uses two sliding spool valves to direct the polymer flow to and from the filter housings. During normal operation, one of the two filter housings is on-stream (i.e., molten polymer is flowing therethrough); the other filter housing is cleaned, installed and heated to be ready to accept the polymer. When the on-stream filter becomes too dirty for continued operation, spool valves of the system are set in motion in the following sequence: (1) the inlet valve of the clean filter housing is slightly opened while the outlet valve of the clean filter housing remains closed to allow the polymer fluid to enter and fill the clean housing; (2) the trapped air in the clean housing is purged through a bleed port until all air is vented from the clean housing; (3) after the clean housing is completely filled with molten polymer, the bleed port is closed and then the outlet valve of the clean housing is fully opened; and (4) the inlet valve of the clean housing is fully opened, after which the inlet and outlet valves of the dirty housing are completely closed. This completes the switching of the polymer fluid from the dirty housing to the clean housing, and the filter of the dirty housing can then be removed for cleaning or replacement. While the clean housing is being filled, the filter element in the dirty housing continues to provide uninterrupted process filtration.

U.S. Pat. No. 5,462,653 to Hills, the disclosure of which is incorporated herein by reference in its entirety, discloses a large area polymer filtration system having a generally cylindrical shape with six candle-type filter housings arranged in pairs in a ring about a central valve and distribution system. A rotatable control plate controls the valve and distribution system and can be set in various positions to allow polymer flow through all of the filter housings or to prevent flow through individual pairs of filter housings while the other housings remain on-stream, in order to permit removal or replacement of clogged or dirty filters. While the control plate can be positioned to prevent flow to individual pairs of filter housings, the filter housings are not individually controllable to be on-stream or off-stream independent of other filter housings (i.e., either four or six filter housings must be on-stream, and filters can be taken off-stream only in pairs, one pair at a time).

Normally, the size of a polymer filtration system is chosen to provide sufficient filtration for the polymer process system at its maximum flow rate. Under certain operating conditions or for certain processes, the process system may be required to run at a reduced capacity, for example, in a process system having multiple functions or in systems producing plural-component polymer products. One problem resulting from running the process system at a reduced capacity or variable capacity is that the molten polymer remains within the filtration system for a relatively long period of time (i.e., the polymer has a high polymer "residence time"). Long residence time and non-uniform residence time can potentially cause thermal degradation of the polymer when thermally sensitive polymers are used.

SUMMARY OF THE INVENTION

It is an object of the present invention to prevent an excessively long residence time of molten polymer within a filtration assembly to avoid thermal degradation of the polymer.

It is another object of the present invention to continuously filter flowable polymer at various filter capacities without significantly changing the polymer residence time in the filter.

It is a further object of the present invention to minimize the variability of the residence time of molten polymer within a filtration assembly.

It is a still further object of the present invention to provide a polymer filtration system having a variable capacity that is adjustable in accordance with a polymer flow rate to control the residence time of a polymer within the filtration system.

It is another object of the present invention to configure a filter housing of a filtration system to minimize the residence time, in dead areas, of molten polymer flowing through the filter housing.

Another object of the present invention is to provide flexibility in removal and insertion of filter housings in a system while assuring that the proper sequence for removal is followed.

The aforesaid objects are achieved individually and in combination, and it is not intended that the present invention be construed as requiring two or more of the objects to be combined unless expressly required by the claims attached hereto.

According to the present invention, a molten polymer filtration assembly includes a minimum of two (and preferably at least three) filter housings which extend from a common inlet passage to a common outlet passage, thereby providing parallel flow paths for filtration of the polymer. Each of the filter housings is, preferably, individually controllable, and can be set in an on-stream state (i.e., permitting molten polymer to flow through the housing) independently of the state of any of the other filter housings, such that any number of the filter housings can be on-stream at a given time. For some applications it may be desirable to control some filter housings in unison (e.g., in pairs), but the preferred embodiment disclosed herein provides for independent control over each filter housing. The individual controllability of the filter housings allows the polymer throughput capacity of the filtration system, defined by the number of filter housings simultaneously on-stream, to be adjusted in accordance with the input polymer flow rate to ensure that the polymer residence time within the filtration system remains below an acceptable maximum duration, and that the polymer residence time is regulated to avoid significant fluctuation or variance of the polymer residence time.

In the preferred embodiment, each filter housing in the filtration assembly includes: an inlet valve controlling flow of polymer from the inlet passage into the housing; an outlet valve controlling the flow of polymer from the housing into the outlet passage; and a filtration passage extending between the inlet and outlet valves and housing a candle-type filtration element. When the inlet and outlet valves are opened, the filter housing is on-stream and allows polymer to flow from the inlet passage to the outlet passage. When the valves of a filter housing are closed, polymer flow is prevented through that filter housing.

During operation with a low polymer flow rate, a small number of filter housings are placed on-stream, and the inlet and outlet valves of the other filter housings are closed. By using a low number of filter housings during low polymer flow conditions, the capacity of the filtration assembly is reduced to correspond to the low flow rate; consequently, the polymer residence time in the filtration assembly is maintained at an acceptable level, and the long polymer residence time that typically results from using a high capacity filtration system under low polymer flow conditions is avoided.

At higher polymer flow rates, additional filter housings are placed on-stream by opening their respective inlet and outlet valves to provide the needed filtration without significantly changing the polymer residence time in the filtration assembly. By setting the number of on-stream filters in correspondence with the polymer flow rate, the polymer residence time can be maintained in a relatively narrow range of durations over a wide range of polymer flow rates. By maintaining one or more filter housings on-stream under normal operating conditions, polymer filtration remains uninterrupted when an on-stream filter housing becomes sufficiently dirty to require replacement with a clean filter housing (which requires the filter housing to be temporarily taken off-stream). The filtration assembly includes safety flaps serving as mechanical interlocks which prevent a filter housing from being removed while still on-stream (i.e., with its valves open).

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

In accordance with the present invention, a molten polymer filtration system includes at least three filter housings which extend from a common inlet passage to a common outlet passage, thereby providing multiple, parallel flow paths for filtration of the polymer. As used herein, the term "parallel" refers to two or more separate flow paths extending from a common inlet path to a common outlet path, which can simultaneously transport separate polymer flows. The term "parallel" does not imply the requirement of a geometrically parallel arrangement unless explicitly stated. Each filter housing is individually controllable, such that any number of filter housings can be on-stream (i.e., in a state permitting molten polymer to flow from the inlet passage to the outlet passage) at a given time. The individual controllability of the filter housings allows the polymer throughput capacity of the filtration system, defined by the number of filter housings simultaneously on-stream, to be adjusted in accordance with the input polymer flow rate to ensure that the polymer residence time within the filtration system remains below an acceptable duration and that the polymer residence time is regulated to avoid significant fluctuation or variance of the polymer residence time.

Figure 1:
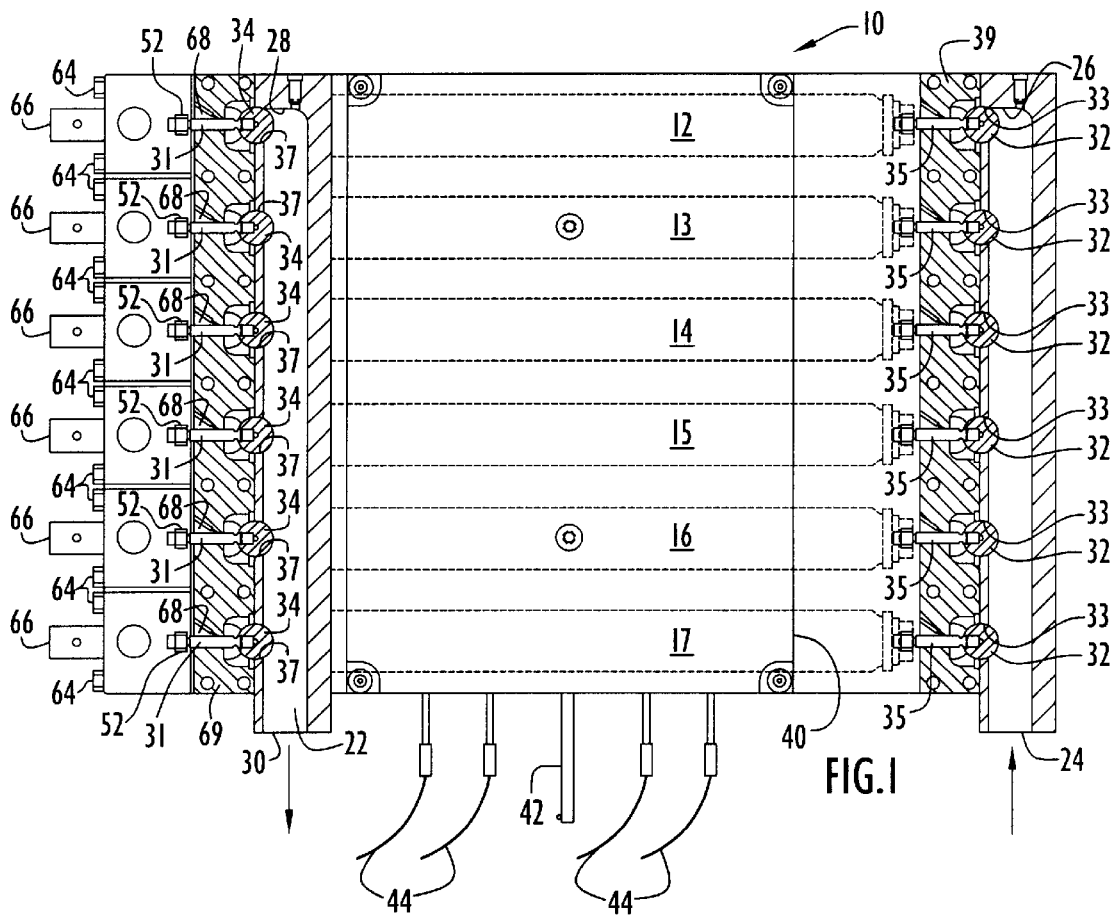
FIG. 1 is a sectional plan view of a variable capacity continuous extended area filtration system in accordance with an exemplary embodiment of the present invention.

Referring to FIG. 1, a continuous, variable-capacity, extended area filter assembly 10 in accordance with the exemplary embodiment of the present invention is shown. Filter assembly 10 includes six filter housings 12, 13, 14, 15, 16 and 17 connecting an inlet passage 20 to an outlet passage 22. More generally, the polymer filter assembly of the present invention includes a minimum of two (and preferably at least three) filter housings, and can have up to any practical number N of filter housings.

Filtration assembly 10 has a generally rectangular layout in plan, with the inlet and outlet passages 20 and 22 extending transversely along opposite sides of the assembly, and with filter housings 12–17 extending longitudinally between the inlet and outlet passages. The "longitudinal" direction is arbitrarily defined to correspond to the direction of polymer flow through the main body of the filter housings 12–17, with the "transverse" direction being arbitrarily defined to correspond to the directions of flow through the inlet and outlet passages 20 and 22. As used herein, these terms do not imply that the "transverse" dimension of the assembly is longer or shorter than the "longitudinal" dimension of the assembly.

More specifically, inlet passage 20 extends substantially linearly through assembly 10 in the transverse direction near a first transverse side of assembly 10, from an inlet port 24 on a first longitudinal side of assembly 10 to a terminal end 26 within assembly 10 near the second longitudinal side. As indicated in FIG. 1 by the arrow at inlet port 24, molten polymer enters filtration assembly 10 through inlet port 24 and flows transversely through inlet passage 20 toward the terminal end 26 (i.e., toward the second longitudinal side).

Outlet passage 22 extends substantially linearly through assembly 10 in the transverse direction near the second transverse side of assembly 10, from a terminal end 28 within assembly 10 near the second longitudinal side to an outlet port 30 on the first longitudinal side of assembly 10. As indicated in FIG. 1 by the arrow at outlet port 30, molten polymer flows through outlet passage 22 toward the first longitudinal side of assembly 10 and exits filtration assembly 10 through outlet port 30.

Figure 2:
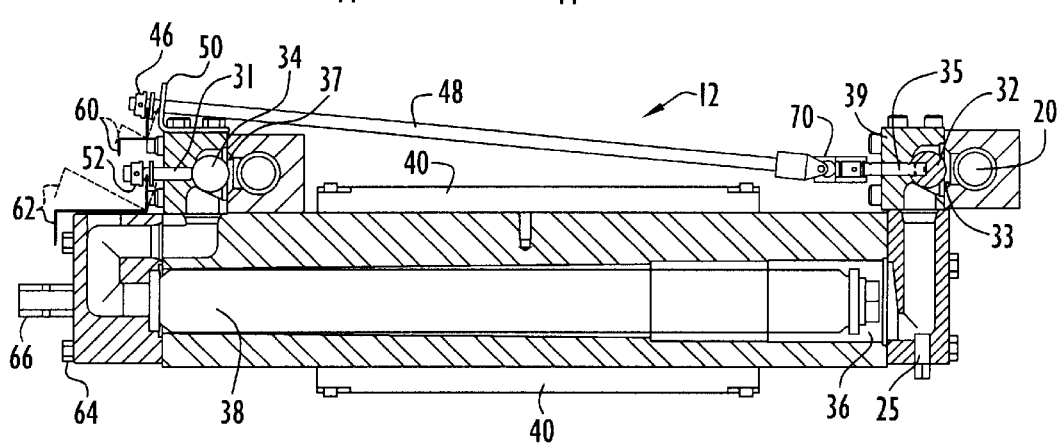
FIG. 2 is a side sectional view in elevation of the filtration system of the exemplary embodiment of the present invention.

A side sectional view of filtration assembly 10, taken along the centerline of a representative filter housing 12, is shown in FIG. 2. The remaining filter housings 13–17 are substantially the same as filter housing 12. Each of the filter housings 12–17 includes, at an upstream end, an inlet valve coupled to inlet passage 20. Each inlet valve comprises a ball member 32 cooperating with an annular seat 33 to control the flow of molten polymer from inlet passage 20 into the respective filter housing. Ball member 32 is secured to a threaded stem 35 that is threadedly engaged in an inlet valve housing block 39 to permit the ball valve to be moved toward and away from seat 33 as the stem is appropriately rotated in housing block 39. Each seat 33 is formed as an annular opening into inlet passage 20 and is centered about an axis that is perpendicular to passage 20 and coaxial with stem 35. Stem 35 is also coaxial with a diameter of ball 32, which is a circular sphere, whereby the axes of stem 35 and seat 33 extend through the center of ball 32. As seen in the preferred embodiment of FIG. 1, the inlet valve balls 32 and seats 33 of the filter housings 12–17 are coupled to inlet passage 20 at regularly spaced intervals, with filter housing 12 being coupled to inlet passage 20 furthest from inlet port 24 at a point near terminal end 26, and filter housings 13–17 being coupled to inlet passage 20 at points successively closer to inlet port 24.

At a downstream end, each of the filter housings 12–17 includes an outlet valve comprising a ball 34 and annular seat 37 coupled to outlet passage 22. Each outlet ball 34 and seat 37 control the flow of molten polymer from the respective filter housing to the outlet passage 22. Ball 34 is secured to a threaded stem 31 that is threadedly engaged in an outlet valve housing block 69 to permit ball 34 to be selectively moved toward and away from seat 37 as the stem is appropriately rotated in housing block 69. Each seat 37 is formed as an annular opening into outlet passage 22 and is centered about an axis that is perpendicular to passage 22 and coaxial with stem 31. Stem 31 is also coaxial with a diameter of ball 34, which is a circular sphere, whereby the axes of stem 31 and seat 37 extend through the center of ball 34. As seen in the preferred embodiment of FIG. 1, the outlet valves of the filter housings 12–17 are coupled to outlet passage 22 at regularly spaced intervals, with filter housing 12 being coupled to outlet passage 22 furthest from outlet port 30 at a point near terminal end 28, and filter housings 13–17 being coupled to outlet passage 22 at points successively closer to outlet port 30.

Each filter housing further includes a filter passage 36 extending from inlet valve 32, 33 to outlet valve 34, 37. As best seen in FIG. 2, filter passage 36 comprises a longitudinally-extending main bore connected at its upstream end to the inlet valve by a generally vertical passage, and connected at its downstream end to the outlet valve by a generally U-shaped passage. A drain 25 at the bottom of the vertical passage allows polymer drainage when the filter housing is idle to prevent polymer degradation. A single, cylindrical candle-type filter element 38 is housed in the main bore of filter passage 36. As shown in FIG. 2, the main bore of filter passage 36 tapers radially inward in the downstream direction. That is, the cross-sectional area (or diameter) of the filter passage decreases in the longitudinal direction along the main bore from the inlet side to the outlet side, such that an annular gap between the sides of the bore and the filter element 38 decreases as polymer flows through the main bore from the inlet side to the outlet side. This tapered shape of the filter passage surrounding the filter element minimizes the volume of stagnantly entrapped polymer and reduces the average residence time as well as the residence time variation along the length of the filter element.

Filter housings 12–17 are sandwiched between cast aluminum heaters 40 to heat the entire assembly to a temperature sufficient to maintain the polymer in a molten state. Heaters 40 are electrical resistance heating elements arranged to receive electrical current via electrical conductors 44. A thermocouple 42 senses the temperature of the heaters 40 and provides a feedback signal to control the current supplied to heating elements 44 to maintain the temperature of heaters 40 at a desired level. The controller for effecting such heating is conventional and is not shown or described in detail herein.

The position of inlet ball 32 relative to seat 33 of each filter housing is controlled by a wrench-actuated nut 46 mounted on the remote end of a shaft 48 extending transversely across filtration assembly 10. More specifically, rotation of nut 46 rotates shaft 48 which is coupled by a knuckle joint 70 to threaded shaft 35 of the inlet valve ball 32. The end of shaft 48 carrying the nut 46 is slidably mounted in a bracket 50 mounted on the top surface of assembly 10 in the vicinity of the outlet valve 34, 37. As shown in FIG. 2, when nut 46 and shaft 48 are rotated clockwise, shafts 48, 35 and ball 32 move toward the inlet valve seat 33. The coaxial relation of shaft 35 and seat 33 with a common diameter of ball 32 assures that the ball, as it is moved by rotation of shaft 48 into the closed valve position, makes continuous annular contact with seat 33. This assures proper valve closure and minimizes galling on the surface of the ball.

Similarly, the position of outlet valve ball member 34 is controlled by a wrench-actuable nut 52 mounted on the remote end of threaded shaft 31 directly below inlet valve control nut 46. When outlet control nut 52 and shaft 31 are rotated clockwise, outlet valve ball member 34 is moved toward valve seat 37; counterclockwise rotation moves the outlet valve ball member 34 away from seat 37 to an open position, allowing molten polymer to flow from the filter passage 36 into outlet passage 22. The coaxial relation of shaft 31 and seat 37 with a common diameter of ball 34 assures that the ball, as it is moved by rotation of shaft 31 into the closed valve position, makes continuous annular contact with seat 37. This assures proper valve closure and minimizes galling on the surface of the ball.

The inlet and outlet valves described above are particularly efficient for controlling polymer flow into and out of the filter housings. The axial symmetry described above also permits effective closure of the valves even if the ball and seat are not fully contacting. This is due to the fact that the symmetrical annular flow restriction formed as the ball approaches the seat causes the flow to be choked off uniformly until the pressure drop across the valve is so high relative to the low pressure drop across the on-stream filters as to effectively provide flow blockage without ball-to-seat contact. If there were no axial symmetry, the resulting non-uniform cross-sectional flow area would permit considerable leakage. This feature further minimizes the possibility of galling on the ball surface.

As will be appreciated from the foregoing description, the state of the inlet valve and the state of the outlet valve of each filter housing are individually controlled by separate, respective control nuts, typically actuated by a suitable wrench. Further, the valves of each individual filter housing are separately controllable, independently of the state of the valves any other filter housing. Consequently, any number of filter housings, from one to N, where N is the number of filter housings in the assembly, can be set in an on-stream state in accordance with the particular requirements of a given process. The same principle applies if two or more filter housings are controlled by a common inlet and outlet valve combination.

Under normal operating conditions (i.e., other than when one of the filter housings is being replaced for cleaning), at least two of the filter housings are maintained in an on-stream state (i.e., the inlet and outlet valves are open to allow molten polymer to flow through the filter housing). During operation with a low polymer flow rate, only two (for example) filter housings 12 and 13, might be on-stream, and the inlet and outlet valves of the other filter housings 14-17 are closed. In this case, the molten polymer fluid enters the filtration assembly through inlet passage 20 and then splits into two sub-streams. One sub-stream flows through filter housing 12 and the other sub-stream flows in parallel through filter housing 13. After leaving filter housings 12 and 13, the polymer sub-streams merge in outlet passage 22 and exit assembly 10 via outlet port 30. By using only two filter housings during low polymer flow conditions, the capacity of the filtration assembly is reduced to correspond to low flow rate operation, and the polymer residence time in any individual filter housing is maintained at an acceptable level. That is, if more filter housings are on-stream than are actually required for a given system flow rate, the residence time in each on-stream filter housing is greater than if fewer filter housings are on-stream. Thus with the present invention, the long polymer residence time that typically results from using a high capacity filtration system under low polymer flow conditions is avoided.

When the polymer flow rate exceeds the combined filtration capacity of the two on-stream housings, additional housing can be put into use to provide the needed filtration without significantly changing the polymer residence time in the filter. With the exception of the condition temporarily created by replacement of a filter housing, the set of on-stream filter housings preferably begins with the furthest filter housing from the inlet port and continues sequentially toward the inlet port up to the number of required on-stream housings. Thus for example, in the exemplary embodiment, when two filter housings are on-stream, remote housings 12 and 13 used; when three filter housings are on-stream, housings 12, 13 and 14 are used; when four filter housings are on-stream, housings 12–15 are used, etc. By using the most remote available filter housings for on-stream operation at any time, the system avoids build-up of stagnant polymer in inlet passage 20 and outlet passage 22 in locations remotely beyond the active (i.e., on-stream) filter housings. By matching the number of on-stream filters to the polymer flow rate, the polymer residence time can be maintained in a relatively narrow range of durations over a wide range of polymer flow rates. In general, the number of required on-stream filter housings is set as a function of the polymer flow rate, the particular polymer being extruded, the nature and amount of contaminants present in the polymer, the desired or acceptable polymer residence time in the filtration assembly, and the acceptable level of fluctuation or variance of the polymer residence time.

When an on-stream filter become too dirty for continued operation, the following procedure is taken in sequential steps to remove the dirty housing and to install a clean housing: (1) the inlet valve 32, 33 of the dirty filter housing is closed by turning control nut 46 clockwise with a suitable wrench; (2) the outlet valve 34, 37 of the dirty filter housing is closed by turning control nut 52 clockwise with a suitable wrench; (3) the dirty filter housing is removed (by loosening nuts 64 and pulling the housing out by handle socket 66) and replaced by a pre-heated clean filter housing (inserted by its handle socket 66 and secured by tightening nuts 64); (4) the inlet valve 32, 33 of the clean filter housing is slightly opened (by turning its control nut 46 counter clockwise) while the outlet valve 34 is kept closed to allow the molten polymer to enter the clean housing; (5) the trapped air in the clean filter housing is purged through a bleed port 68 (FIG. 1) until all air is vented from the housing; (6) after the clean filter housing is completely filled with polymer, the outlet valve 34, 37 of that filter housing is opened fully by turning control nut 52 counterclockwise (the bleed port 68 is completely closed when the outlet valve 34 is at the fully opened position); and (7) the inlet valve 32, 33 of the filter housing is opened fully by turning its control nut counterclockwise. This completes the procedure of replacing a dirty filter housing with a clean filter housing. These same step are repeated for each on-stream filter housing (e.g., any of housing 12–17) once the filter housing becomes dirty and requires replacement with a clean filter housing.

Figure 3:
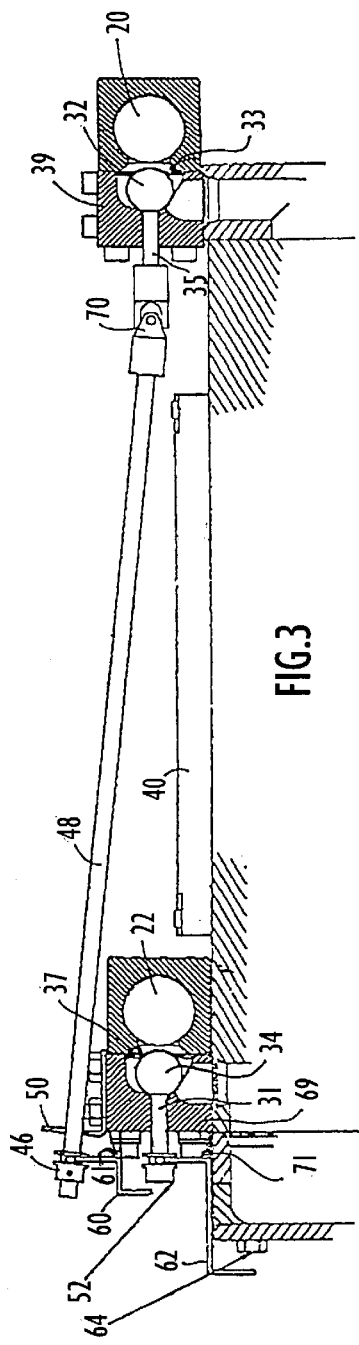
FIG. 3 is an enlarged view similar to that of FIG. 2 showing both valves of the filter housing fully open.
Figure 4:
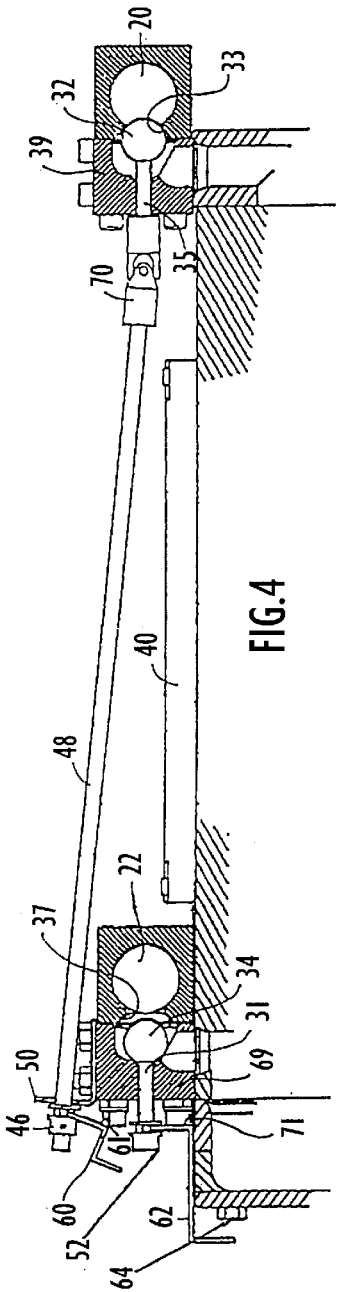
FIG. 4 is a view similar to that of FIG. 3 showing the inlet valve closed and the outlet valve fully open.
Figure 5:
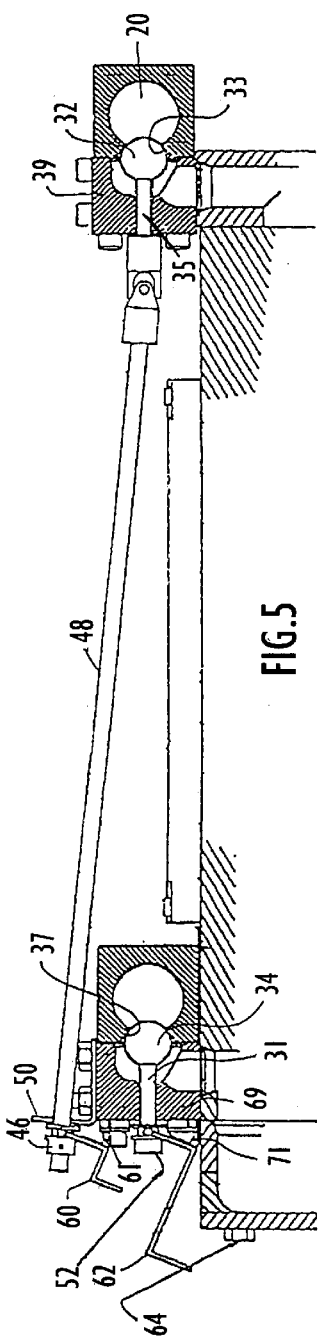
FIG. 5 is a view similar to that of FIG. 3 showing both valves fully closed.

Referring to FIGS. 3–5, pivotable safety plates 60 and 62 (not shown in FIG. 1 to preserve clarity) provide a mechanical interlock function ensuring that the correct procedure is used to change the filter housing and preventing a filter housing from being removed from the assembly while containing polymer under pressure. Upper safety plate 60 has two right angle bends sub-dividing the plate into a middle section and upper and lower end sections extending perpendicularly in opposite directions from opposite ends of the middle section. The distal end of the upper end section of plate 60 is apertured to receive and be engaged by control shaft 48 of the inlet valve. To this end, a suitable lock washer on shaft 48 is provided to engage the distal upper end of plate 60 between the lock washer and control nut 46. The juncture between the middle section and upper end section of plate 60 is pivotably mounted on housing block 69 (e.g., by means of a piano hinge, or the like) to pivot about a horizontal axis 61. The middle section of plate 60, when thusly mounted, extends away from block 69. When pivotable plate 60 is pivoted about axis 61 to its most counterclockwise position (as viewed in FIG. 3), the lower end section of plate 60 is suspended partially in front of control nut 52 for the outlet valve, thereby blocking access with a wrench to that control nut. In this position of plate 60, both control nuts 46 and 52 are fully counterclockwise and both the inlet and outlet valves are fully open.

Lower safety plate 62 also has two right angle bends that sub-divide it into a middle section and upper and lower end sections extending perpendicularly in opposite directions from opposite ends of the middle section. The distal end of the upper section of plate 62 is apertured to receive and be engaged by control shaft 31 of the outlet valve. To this end, a suitable lock washer on shaft 31 is provided to engage the distal upper end of plate 62 between the lock washer and control nut 52. The juncture between the middle section and upper section of plate 62 is pivotably mounted (e.g., by means of a piano hinge, or the like) on the assembly to pivot about a horizontal axis 71. The middle section of plate 62, when thusly mounted, extends away from the assembly. When plate 62 is pivoted about axis 71 to its most counterclockwise position (as viewed in FIG. 3), the lower end section of plate 62 is suspended partially in front of the upper two nuts 64 that secure the filter housing to the assembly, thereby blocking access with a wrench to those nuts.

As shown in FIG. 3, when both the inlet valve 32, 33 and the outlet valve 34, 37 are fully open, safety plate 60 blocks access to outlet valve control nut 52, and safety plate 62 blocks access to filter housing securing nuts 64. Accordingly, the outlet valve cannot be closed, and the filter housing cannot be removed from the assembly.

In FIG. 4 the inlet valve has been fully closed; that is, control nut and shaft 48 have been rotated fully clockwise about axis 61, thereby rendering outlet valve control nut 52 accessible with a wrench to permit the outlet value to be closed. However, while the outlet valve remains open (as shown in FIG. 4), the lower end section of plate 62 continues to block access to nuts 64, thereby preventing removal of the filter housing from the assembly.

When the outlet valve is closed (as shown in FIG. 5), plate 62 is pivoted clockwise so that its lower end section is pivoted away from nuts 64. It will be appreciated, therefore, that the outlet valve 34, 37 for that filter housing cannot be removed from the assembly unless both its outlet and inlet valves are closed. When replacing a filter element that has been removed from the assembly, the element cannot be secured to the assembly unless the outlet valve is closed, and the outlet valve cannot be closed unless the inlet valve has been closed. Importantly, this all assures that the opening and closing of valves, and the removal and insertion of filter elements, must be performed in the prescribed proper sequence.

Note that, while one dirty filter element is being replaced, the remaining on-stream filter housing(s) continue to provide uninterrupted process filtration. Because at least two filter housings are on-stream under normal operating conditions, replacement of a single filter housing at a time never interrupts the filtration process.

It is to be understood that the principles of the present invention are not limited to the particular structure illustrated in the exemplary embodiment. Different types of polymer filter units (e.g., screens), different filter valving units, and different interlocking mechanisms may be utilized, all within the scope and spirit of the principles described herein and incorporated in the accompanying claims.

Although the preferred embodiment described herein utilizes a single filter element in each filter housing, this feature is not to be construed as limiting the scope of the invention; that is, plural filter units may define the filter passage in any filter housing. Likewise, the invention contemplates that each inlet and outlet valve pair can control plural filter housings rather than a single filter housing as described for the preferred embodiment.

Further, although the inlet and outlet valves are disclosed as being manually actuable, the principles of the present invention also apply where the valves are controlled automatically (e.g., robotically, etc.). Under such circumstances the interlocking function provided by the safety plates (i.e., to assure proper operational sequence in taking filters on-stream and off-stream) can be replaced by a programmed sequence of operation of the automatic control equipment.

As noted above, a feature of the present invention is the minimization of stagnant (i.e., non-flowing) polymer pools in the filter assembly. In the preferred embodiment, as described above, this feature is achieved in part by placing on-stream only the filter passages most remote from inlet port 24 and outlet port 30. More particularly, if filter 15 is open while more remote filters 12, 13 and 14 are closed, polymer in inlet passage 20 downstream of the inlet valve for filter 15 would collect and stagnate. Likewise, polymer in outlet passage 22 upstream of the outlet valve for filter 15 would collect and stagnate. By preferentially opening the filter passages most remote from ports 24 and 30, such collection of polymer is avoided. Stated otherwise, proper operation requires that if a filter is off-stream (i.e., not on-stream), polymer to be filtered by the on-stream filter(s) should flow past the closed inlet and outlet valves of the off-stream filters rather than be shunted or short-circuited prior to reaching those off-stream filters. In this regard, it is also within the scope of the invention to apply this "flow past" principle to filter assemblies in which the filters are equally spaced from the inlet/outlet passages. For example, if plural filter passages were to branch out in different radial directions from the same axial location of a common inlet passage, the inlet valve for each filter passage should be located at that axial location so that polymer must flow past each closed inlet valve in order to enter any open filter passage. In this manner, no polymer enters any part of any off-stream filter passage where it could collect and stagnate.

Having described preferred embodiments of new and improved variable capacity continuous extended area filter, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of filtering molten polymer in a filter assembly having an inlet passage, an outlet passage and N individually selectable filtering passages connecting the inlet passage to the outlet passage, where N is an integer greater than two, the method comprising the steps of:
   a) selecting an input flow rate of molten polymer supplied to the inlet passage of the filter assembly;
   b) opening a number M of the N filtering passages, where M is selectable as any integer from 1 to N, wherein the number M of filtering passages is selected as a function of the input flow rate such that a residence time period of the molten polymer in the filter assembly is less than a predetermined duration; and
   c) filtering the molten polymer through the open filtering passages of the filter assembly.

2. The method of claim 1 wherein said filter assembly includes: an inlet port for receiving unfiltered molten polymer at the upstream end of said inlet passage; and an outlet port for egressing filtered molten polymer from a downstream end of said outlet passage; wherein said N filtering passages are connected to said inlet and outlet passage at successively spaced distances from said inlet and outlet ports, wherein said filtering passages are shut down and removed from the assembly for cleaning as needed and are therefore sometimes unavailable, and wherein step (b) includes always selecting the M available filtering passages that are connected to the inlet and outlet passages at the most remote locations from the inlet and outlet ports.

3. The method of claim 2 wherein said filtering passages are each controlled by individually and selectively actuable inlet and outlet valves connecting the filtering passages to said inlet passage and outlet passage, respectively, said method further comprising the step of preventing closure of said outlet valve in each filtering passage unless the inlet valve of that filtering passage is closed.

4. The method of claim 3 further comprising the step of preventing removal of each filtering passage unless the outlet valve for that filtering passage is closed.

5. The method of claim 1 further comprising the step of preventing removal of each filtering passage from the assembly if that filtering passage is open.

6. The method of claim 1 wherein step b) includes selecting said M filtering passages such that polymer flow through the inlet passage to the M passages must flow past an inlet end of all of the unopened filtering passages.

7. The method of claim 6 wherein step b) further includes selecting said M filtering passages such that polymer flow through said outlet passage must flow past an outlet end of all of the unopened filtering passages.

8. A method of varying the capacity of a molten polymer filtering assembly having an inlet passage, an outlet passage and N individually actuable filtering passages connecting the inlet passage to the outlet passage, where N is an integer greater than two and wherein the assembly has the ability to operate with any number of one through N filtering passages as selected by an operator, the method comprising the step of:

actuating only the minimum number of said N filtering passages as are required to accommodate a desired polymer flow rate, in a range of polymer flow rates, through said assembly while minimizing residence time of polymer in said assembly.

9. The method a claim 8 wherein said step of actuacting includes selecting for actuation the filtering passages located such that stagnated pockets of non-flowing polymer are substantially eliminated.

10. The method of claim 9 wherein the step of selecting includes selecting the filtering passages located most remote from the assembly input port at which molten polymer is received.

11. The method of claim 9 wherein the step of selecting includes selecting the filtering passages such that flow thereto through said inlet passage must flow past an inlet end of each unselected filtering passage.

12. The method of claim 9 wherein the step of selecting further includes selecting the filtering passages such that flow therefrom through said outlet passage must flow past an outlet end of each unselected filtering passage.

13. A method of filtering molten polymer in a filter assembly having an inlet passage, an inlet port at an upstream end of said inlet passage for receiving unfiltered molten polymer, an outlet passage, an outlet port at a downstream end of said outlet passage through which filtered molten polymer exits, and N individually selectable filtering passages connecting the inlet passage to the outlet passage at successively spaced distances from said inlet and outlet ports, where N is an integer greater than one, wherein said filtering passages are shut down and removed from the assembly for cleaning as needed and are therefore sometimes unavailable, the method comprising the steps of:

a) selecting an input flow rate of molten polymer supplied to the inlet passage of the filter assembly;

b) opening a number M of the N filtering passages, where M is selectable as any integer from 1 to N, wherein the number M of filtering passages is selected as a function of the input flow rate such that a residence time period of the molten polymer in the filter assembly is less than a predetermined duration, and wherein the M filtering passages opened are the M available filtering passages that are connected to the inlet and outlet passages at the most remote locations from the inlet and outlet ports; and c) filtering the molten polymer through the open filtering passages of the filter assembly.

14. The method of claim 13, wherein said filtering passages are each controlled by individually and selectively actuable inlet and outlet valves connecting the filtering passages to said inlet passage and outlet passage, respectively, said method further comprising the step of preventing closure of said outlet valve in each filtering passage unless the inlet valve of that filtering passage is closed.

15. The method of claim 14, further comprising:

preventing removal of each filtering passage unless the outlet valve for that filtering passage is closed.

16. The method of claim 13, further comprising:

preventing removal of each filtering passage from the assembly if that filtering passage is open.

17. The method of claim 13, wherein step b) includes selecting said M filtering passages such that polymer flow through the inlet passage to the M passages must flow past an inlet end of all of the unopened filtering passages.

18. The method of claim 17, wherein step b) further includes selecting said M filtering passages such that polymer flow through said outlet passage must flow past an outlet end of all of the unopened filtering passages.

19. A method of varying the capacity of a molten polymer filtering assembly having an inlet passage, an outlet passage and N individually actuable filtering passages connecting the inlet passage to the outlet passage, where N is an integer greater than one, the method comprising the step of:

actuating only the minimum number of said N filtering passages as are required to accommodate the desired polymer flow rate through said assembly while minimizing residence time of polymer in said assembly, wherein the filtering passages selected for actuation are located such that stagnated pockets of non-flowing polymer are substantially eliminated.

20. The method of claim 19, further comprising selecting the filtering passages located most remote from the assembly input port at which molten polymer is received.

21. The method of claim 19, further comprising selecting the filtering passages such that polymer flowing thereto through said inlet passage must flow past an inlet end of each unselected filtering passage.

22. The method of claim 19, further comprising selecting the filtering passages such that polymer flowing therefrom through said outlet passage must flow past an outlet end of each unselected filtering passage.

* * * * *